United States Patent
Kalka

[11] Patent Number: 5,424,044
[45] Date of Patent: Jun. 13, 1995

[54] INTEGRATED SCR ELECTROSTATIC PRECIPITATOR

[75] Inventor: Daniel S. Kalka, Medina, Ohio

[73] Assignee: The Babcock & Wilcox Company, New Orleans, La.

[21] Appl. No.: 216,709

[22] Filed: Mar. 23, 1994

[51] Int. Cl.⁶ .................. B01D 53/32; B01D 53/56
[52] U.S. Cl. ........................ 422/171; 95/59; 95/63; 96/52; 96/55; 422/172; 422/187; 423/239.1
[58] Field of Search ............. 95/58, 59, 63; 96/52, 96/55; 423/239.1; 422/172, 171, 187

[56] References Cited

U.S. PATENT DOCUMENTS

| | | | |
|---|---|---|---|
| 4,434,147 | 2/1984 | Dimpfl et al. | 423/235 |
| 4,888,158 | 12/1989 | Downs | 423/242 |
| 4,925,633 | 5/1990 | Doyle | 422/171 |
| 5,008,628 | 4/1991 | Krigmont et al. | 324/693 |
| 5,300,270 | 4/1994 | Krigmont et al. | 423/239.1 |

FOREIGN PATENT DOCUMENTS 2192624 1/1988 United Kingdom ............... 422/172

Primary Examiner—Robert J. Warden
Assistant Examiner—Robert Carpenter
Attorney, Agent, or Firm—Daniel S. Kalka; Robert J. Edwards

[57] ABSTRACT

An integrated SCR ESP employs catalytic collector plates for $NO_x$ and particulate removal. Ammonia injected either directly in the ESP or upstream therefrom catalytically reduces $NO_x$ to nitrogen and water. The excess ammonia assists in capturing particulates in the ESP. This prevents problems of ammonia slippage. The SCR catalytic collector plates are positioned in at least one field of the ESP and preferably in at least the first field.

10 Claims, 3 Drawing Sheets

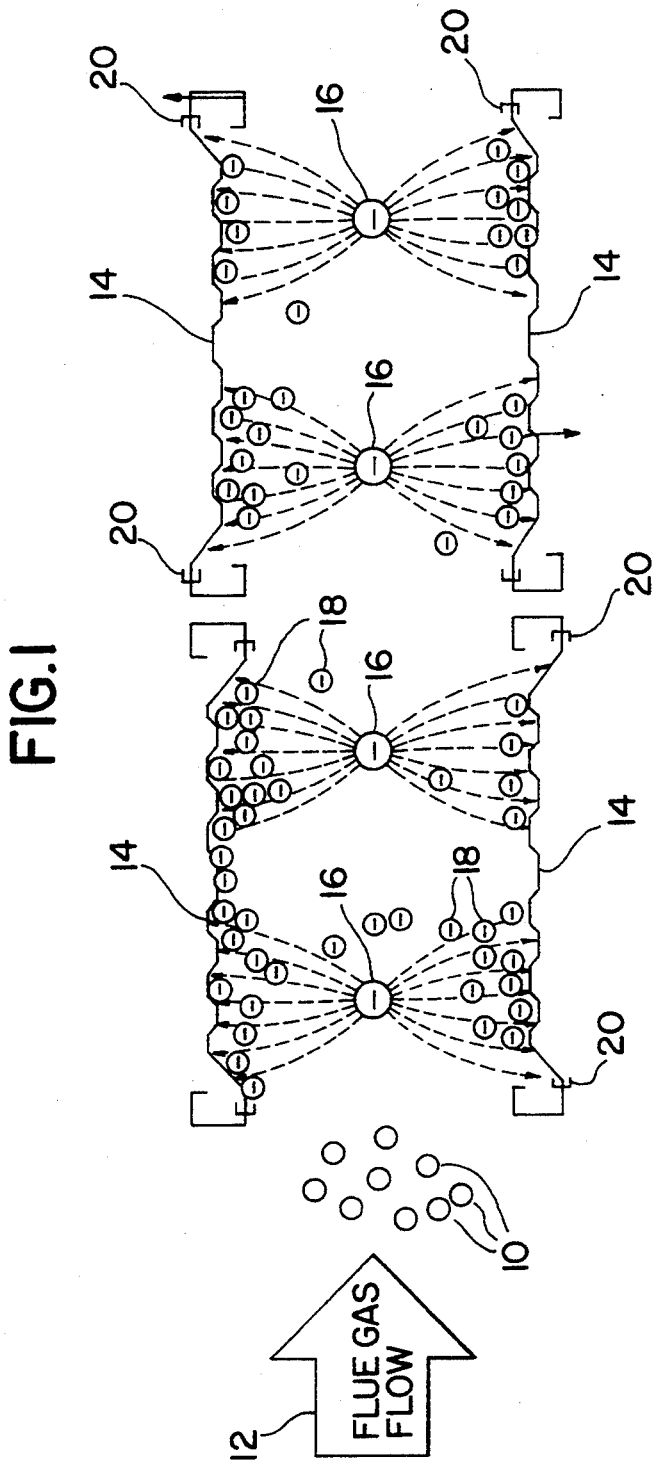

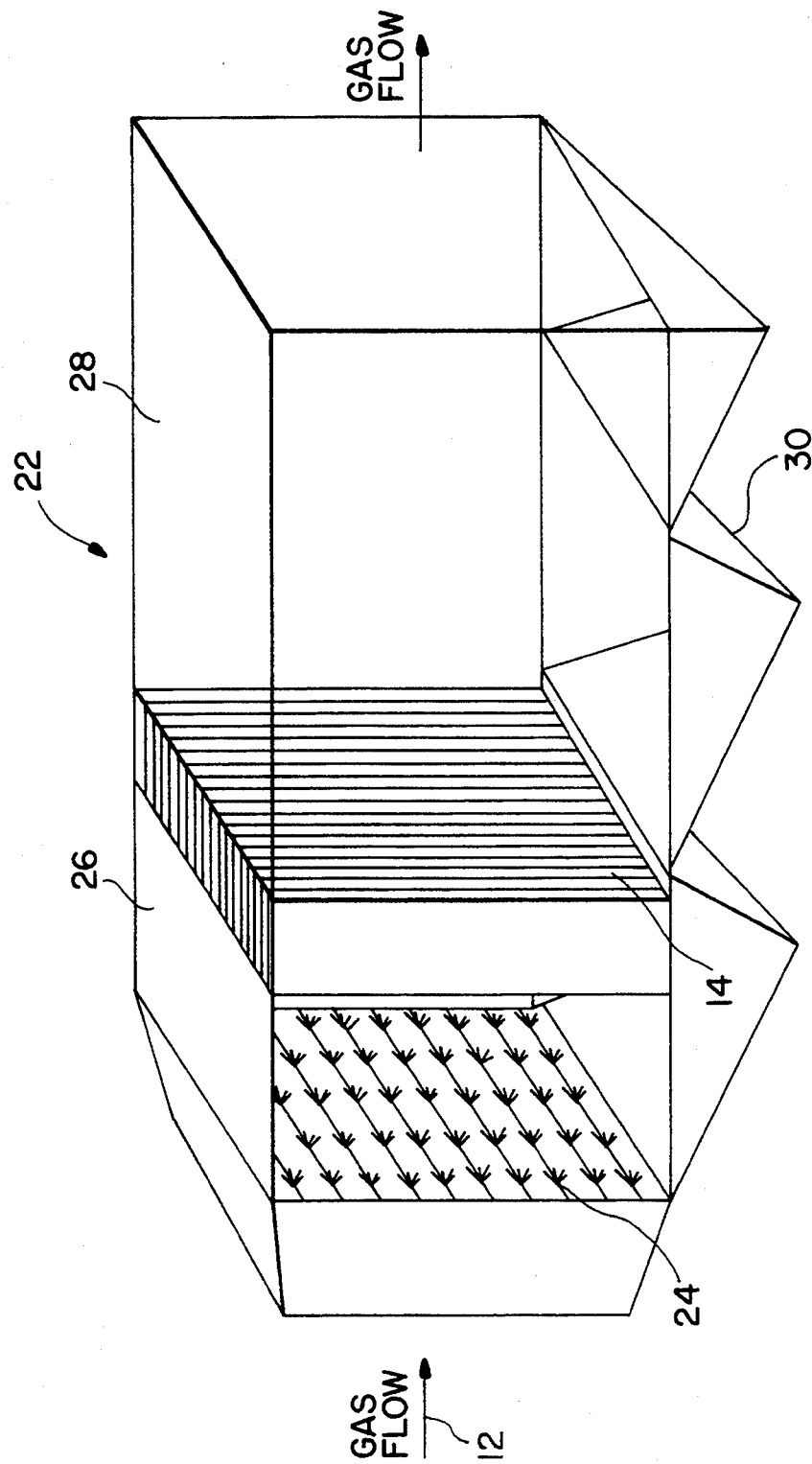

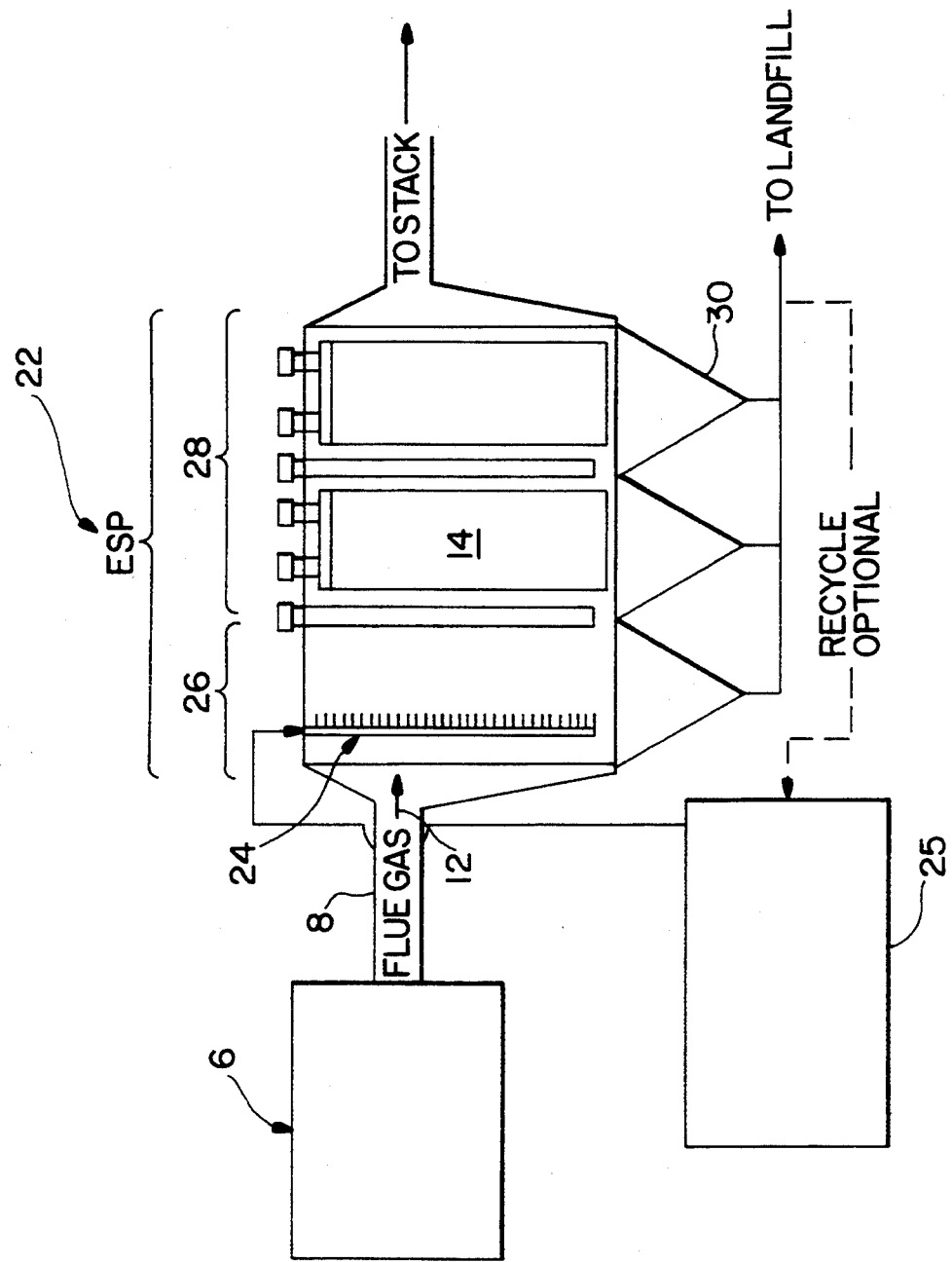

INTEGRATED SCR ELECTROSTATIC PRECIPITATOR

BACKGROUND OF THE INVENTION

1. Field of the Invention

The present invention relates in general to an apparatus and method for removing nitrogen oxides and particulate from a flue gas, and in particular to a catalytic electrostatic precipitator which reduces nitrogen oxides with ammonia and simultaneously removes particulate matter from the flue gas.

2. Description of the Related Art

Selective catalytic reduction (SCR) systems catalytically reduce flue gas nitrogen oxides ($NO_x$) to nitrogen ($N_2$) and water ($H_2O$) using ammonia ($NH_3$) in a chemical reduction. The term ammonia as used herein is meant to include aqueous ammonia or anhydrous ammonia as well as an ammonia reagent or precursor, like urea, or mixture thereof. This technology is an effective method of reducing $NO_x$ missions especially where high removal efficiencies (70%-90%) are required. Environmental considerations will likely require this technology on many installations during the upcoming year.

The $NO_x$ reduction reactions take place as the flue gas passes through a catalyst chamber in an SCR reactor. Before entering the catalyst, ammonia is injected into and mixed with the flue gas. Once the mixture enters the catalyst, the $NO_x$ reacts with ammonia as represented by the following equations:

$$4NO + 4NH_3 + O_2 \rightarrow 4N_2 + 6H_2O \qquad (I)$$

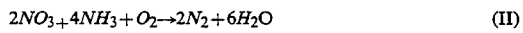

$$2NO_3 + 4NH_3 + O_2 \rightarrow 2N_2 + 6H_2O \qquad (II)$$

The SCR reactions take place within an optimal temperature range. A variety of catalysts are available and known in this art. Most can operate within a range of 450° F. to 840° F. (232° C. to 499° C.), but optimum performance occurs between 675° F. to 840° F. (357° to 499° C.). The minimum temperature varies and is based on fuel, flue gas specifications, and catalyst formulation. In addition, this minimum temperature tends to increase the flue gas sulfur dioxide content. This results in a smaller operating range as sulfur content increases in order to eliminate the formation of ammonium sulfate salts in a catalyst bed. Above the recommended temperature range, a number of catalyst materials tend to become less effective.

Catalyst material typically falls into one of three categories: base metal, zeolite, and precious metal.

Most of the operating experience to date has been with base metal catalysts. These catalysts use titanium oxide with small amounts of vanadium, molybdenum, tungsten or a combination of several other chemical agents. The base metal catalysts are selective and operate in the specified temperature range. The major drawback of the base metal catalyst is its potential to oxidize $SO_2$ to $SO_3$; the degree of oxidation varies based on catalyst chemical formulation. The quantities of $SO_3$ which are formed can react with the ammonia carryover to form the ammonium sulfate salts as previously discussed. They also can react with $SO_2$ so sulfites and bisulfites are formed.

Most modern SCR systems use a block type catalyst which is manufactured in the parallel plate or honeycomb configurations. For ease of handling and installation, these blocks are fabricated into large modules.

Each catalyst configuration has its advantages. The plate type unit offers less pressure drop and is less susceptible to plugging and erosion when particulate-laden flue gas is treated in the SCR reactor. The honey-comb configuration often requires less reactor volume for a given overall surface area. The catalyst is housed in a separate reactor which is located within the system. At a set location, the catalyst permits exposure to proper SCR reaction temperatures.

In general, the stoichiometry of $NO_x$ reduction is a 1:1 mole ratio of $NH_3$ to $NO_x$. Based on the stoichiometry, for example, a theoretical mole ratio of 0.80 is required for 80% $NO_x$ removal. However, the actual mole ratio required is slightly higher to account for unreacted ammonia carryover from the reactor ($NH_3$ slip). Some systems employ a continuous emission monitoring system (CEM) to monitor all atmospheric pollutants. Data generated from the CEM system can be used to control the ammonia flow while achieving the required $NO_x$ emissions level.

The design of each SCR system is unique. The major items to be considered include space constraints, location of existing equipment, temperature requirements, fuel and cost. One location for the SCR reactor is downstream from a boiler or combustion source and upstream of an air preheater which is upstream of a particulate collection device. Another possible location for the SCR reactor is downstream of the particulate collection device immediately after some form of heat exchanger. It is also known to employ an SCR reactor in a combined cycle heat recovery steam generator location (HRSG).

U.S. Pat. No. 4,871,522 discloses the use of a combined catalytic baghouse and heat pipe air heater. This patent describes catalytically coating surfaces of the heat pipe air heater which is located downstream of the catalytic baghouse for $NO_x$ removal.

Electrostatic precipitators (ESP) are devices known in the art that electrically charge the ash particles in a flue gas to collect and remove them. The unit includes a series of parallel vertical plates through which the flue gas passes. Centered between the plates are charging electrodes which provide an electric field. FIG. 1 is a plan view of a typical ESP section which indicates the above-process arrangement. U.S. Pat. No. 4,888,158 describes modifications made to an electrostatic precipitator which allow for an alkaline slurry to be sprayed therein for the removal of sulfur oxides ($SO_x$) with the use of a droplet impingement device.

There still exists a need for an integrated electrostatic precipitator which allows for the injection of ammonia with a catalytic reduction of the $NO_x$ while particulates are simultaneously removed at the collector plates. Preferably, the collector plates would be catalytically coated with an SCR catalyst or alternately constructed of the SCR catalyst.

SUMMARY OF THE INVENTION

The present invention is directed to the aforementioned problems with the prior art as well as others by providing an integrated SCR electrostatic precipitator. The present invention employs at least one SCR catalyst plate in at least one field of an electrostatic precipitator. Ammonia is injected inside the ESP in at least one field which has its electrical components removed therefrom, or alternately directly upstream of the ESP. Advantageously, the ammonia reduces the nitrogen oxides in the flue gas in the presence of the SCR catalyst as well as assists in capturing particulates in the electrostatic precipitator. Thus, the NH$_3$ has a dual purpose, i.e., to reduce NO$_x$ and to increase the efficiency of particulate removal in the ESP. Similarly, the catalyst plates can serve a dual purpose, they act as a ground for particles in the ESP and as a catalyst in selective catalytic reduction of NO$_x$. Also, the catalyst plates are positioned in one or more fields for the collector plates.

An object of the present invention is to provide an apparatus for removing nitrogen oxides and particulates from a flue gas with an integrated SCR/ESP.

Another object of the present invention is to provide a method for removing nitrogen oxides and particulates from a flue gas with an integrated SCR ESP.

Still another object of the present invention is to provide a catalytic ESP.

A further object of the present invention is to provide replaceable catalytic collector plates for an ESP.

A further object of the present invention is to provide an apparatus for removing nitrogen oxides and particulates from a flue gas which is simple in design, rugged in construction, and economical to manufacture.

The various features of novelty which characterize the invention are pointed out with particularity in the claims annexed to and forming a part of this disclosure. For a better understanding of the present invention, and the operating advantages attained by its uses, reference is made to the accompanying drawings and descriptive matter in which a preferred embodiment of the invention is illustrated.

BRIEF DESCRIPTION OF THE DRAWINGS

In the drawings:

FIG. 1 is a plan view of an ESP section in accordance with one embodiment of the present invention;

FIG. 2 is a schematic block diagram of the present invention illustrating an electrostatic precipitator with portions removed as modified according to another embodiment of the present invention; and FIG. 3 is a schematic illustration with a portion removed from the ESP illustrating the present invention.

DESCRIPTION OF THE PREFERRED EMBODIMENT

Referring to the figures where like numerals designate like or similar features throughout the several views, and in particular to FIG. 1, there is shown a plan view of an ESP section in accordance with one embodiment of the present invention. An electrostatic precipitator electrically charges particulate matter (10) in a flue gas (12) produced from a combustion source such as a boiler or furnace for example. An ESP is a device well known in this art used to clean particulates from a flue gas. The present invention modifies the device by providing at least one catalytic collector plate therein. The particulate matter (10) is electrically charged in the flue gas and removed therefrom. Ordinarily, an ESP includes a series of parallel vertical plates through which the flue gas (12) passes. Charging electrodes (16) centered between the catalytic collector plates (14) provide an electric field. The catalytic collector plates (14) are typically electrically grounded and may include the positive electrode components. A high voltage power source not shown establishes an electric field between the discharge electrodes and the collecting surface. As the flue gas passes through the electric field the particulate takes on a negative charge which depending on particle size is accomplished by field charging or diffusion. The negatively charge particles are attracted toward the grounded collection plates and migrate across the gas flow. As the particulates accumulate on the collector plates they form a layer which is periodically removed such as by wrapping. Standard ESPs are devices well known within this art and no further explanation of their operation is necessary. In the present invention unlike standard ESP, the collector plates (14) are constructed of an SCR catalyst or catalytically coated with a catalyst that reduces nitrogen oxides with ammonia. Preferably the catalytic collector plates (14) of the present invention are arranged as vertical plates in at least one field of the ESP. Preferably they are situated in the first field, however, they may be arranged in any or even all of the fields of an ESP. Suitable alternate embodiments include positioning the catalytic collector plates in even the last field if it is desirable to remove particulates prior to reducing NO$_x$ to extend catalyst life. A channel (20) may be constructed in the mounting hardware of the ESP to slidably engage the catalytic collector plates (14) to hold them in position yet allow easy removal for replacement or repair.

Next, referring to FIG. 2, there is shown an integrated SCR electrostatic precipitator in accordance with another embodiment of the present invention. The flue gas generated from a combustion source including but not limited to a boiler or furnace flows through a duct where it enters the integrated SCR ESP generally designated (22). An ammonia injection or introduction means (24) such as an ammonia injection grid or a bank of atomizers sprays ammonia into the flue gas (12). The term ammonia as used herein is meant to include aqueous ammonia, anhydrous ammonia, ammonia precursors like urea or an ammonia reagent and/or mixtures thereof. One field (26) of the electrostatic precipitator has some or all of the electrical components removed therefrom. Catalytic collector plates (14) are positioned downstream from the ammonia injecting means (24). The catalytic collector plates (14) are preferably positioned in the first field of the electrostatic precipitator. However, an advantage of the present invention is that the catalytic collector plates (14) may be positioned in one or more fields of the electrostatic precipitator.

As shown in FIG. 2, the catalytic collector plates (14) may be employed without the electrical components and used as an SCR reactor contained within one field of the ESP. Also, catalytic collector plates can be located in the other fields.

In the present invention, the ammonia has a dual purpose. It reduces NO$_x$ and increases the efficiency of the particulate removal in the ESP. FIG. 2 shows the catalytic collector plates (14) positioned in the first empty section (26) of the electrostatic precipitator along with the ammonia injection means (24). Section (28) is the active section of the ESP and the SCR catalytic collector plates may be positioned there instead or even in conjunction with the catalytic collector plates in the first empty field (26).

FIG. 3 shows the catalytic collector plates (14) in the active section (28) of the electrostatic precipitator.

In FIG. 3, flue gas (12) generated from a combustion source (6) passes through duct (8) into the integrated SCR ESP (22) according to the present invention. An ammonia injection or introduction means (24) introduces ammonia supplied from an ammonia source (25) into the flue gas stream as it enters the integrated SCR ESP (22). The first field (26) of the ESP (22) has its electrical components removed and contains the ammonia introduction means (24). In the active section (28) of the ESP (22) the catalytic collector plates (14) catalytically reduce $NO_x$ and collect particulates from flue gas (12). The catalytic collector plates (14) may either be positioned in the last field or in all of the active fields. The integrated SCR ESP (22) is preferably located in the optimal temperature range for selective catalytic reduction and may be referred to as an $E-NO_x$ system. The clean flue gas is discharged to the atmosphere by way of a stack. The particulates are collected in hoppers (30) for disposal to a landfill or use in another process. Also, the option of recycling is available for generating an ammonia reagent.

An alternate embodiment of the present invention is to utilize the ammonia injection grid (24) in the duct (18) prior to the electrostatic precipitator (22). At least one field of the electrostatic precipitator, and preferably more would contain catalytic collector plates for $NO_x$ and particulate removal.

The present invention provides advantages to the industry which include easier retrofitting due to overcoming space constraints and less ammonia slippage into the atmosphere. In instances where the base-metal catalyst oxidizes $SO_2$ to $SO_3$, the $SO_3$ is used along with the ammonia in the integrated SCR ESP for particulate removal. Since the catalytic collector plates may be substituted for the regular collector plates in one or more fields of the ESP, this provides custom fitting for a particular system. Advantageously, the collector plates may be catalytically coated or constructed of a suitable SCR catalyst. While the collector plates are preferentially positioned vertically in the ESP they may be positioned in any fashion. By providing channels (20) that slidably engage the catalytic collector plates (14), the catalytic collector plates (14) may be easily replaced by simply sliding them in and out of the ESP as the catalyst deteriorates due to erosion or corrosion.

While specific embodiment of the invention have been shown and described in detail to illustrate the application and the principles of the invention, certain modifications and improvements will occur to those skilled in the art upon reading the foregoing description. It is thus understood that all such modifications and improvements have been deleted herein for the sake of conciseness and readability but are properly within the scope of the following claims.

I claim:

1. An apparatus for removing nitrogen oxides and particulates from a flue gas, comprising:
   an electrostatic precipitator positioned in a flue gas stream, said electrostatic precipitator having a plurality of fields with electrical components to remove particulates from the flue gas stream, said electrostatic precipitator having at least one field without electrical components;
   means for introducing ammonia in said electrostatic precipitator in the at least one field without the electrical components; and
   at least one catalyst positioned in the at least one field of said electrostatic precipitator without electrical components for selective catalytic reduction of nitrogen oxides and subsequent particulate removal.

2. An apparatus as recited in claim 1, wherein said introducing means comprises an ammonia injection grid.

3. An apparatus as recited in claim 1, wherein said introducing means comprises a bank of atomizers.

4. An apparatus as recited in claim 1, wherein said at least one catalyst is a catalytic plate coated with a selective catalyst for reducing nitrogen oxides.

5. An apparatus as recited in claim 1, wherein said at least one catalyst is a catalyst plate constructed of a selective catalyst.

6. An apparatus as recited in claim 1, wherein said at least one field of said electrostatic precipitator without electrical components includes a first field of said electrostatic precipitator.

7. A method for removing nitrogen oxides and particulates from a flue gas, comprising the steps of:
   positioning an electrostatic precipitator having a plurality of fields with electrical components in a flue gas stream;
   removing electrical components from at least one field of said electrostatic precipitator;
   positioning a catalyst for selective catalytic reduction of nitrogen oxides in the at least one field of the electrostatic precipitator;
   introducing ammonia into the flue gas stream;
   passing the flue gas stream through the electrostatic precipitator having the at least one catalyst positioned therein;
   catalytically reducing nitrogen oxides in the flue gas; and
   removing particulates from the flue gas.

8. A method as recited in claim 7, wherein the introducing step includes the step of introducing the ammonia in the at least one field of the electrostatic precipitator without electrical components.

9. A method as recited in claim 7, wherein the at least one field includes the first field of the electrostatic precipitator.

10. A method as recited in claim 7, wherein the introducing step includes the step of injecting the ammonia in a duct upstream of the electrostatic precipitator.

* * * * *